Patented Dec. 8, 1936

2,063,102

UNITED STATES PATENT OFFICE 2,063,102

POROUS REFRACTORY INSULATING CEMENT

Otis L. Jones, Joliet, Ill., assignor, by direct and mesne assignments, of one-half to The Illinois Clay Products Company, Joliet, Ill., a corporation of Illinois, and one-half to F. E. Schundler & Company, Inc., Joliet, Ill., a corporation of Illinois No Drawing. Application July 24, 1933, Serial No. 681,961

3 Claims. (Cl. 106—18)

This invention relates to an insulating cement and to a method of producing the same.

Previously, it has been customary to use some mineral fiber, such as asbestos, as a reinforcing material or binder in heat resisting and insulating cements. The present invention seeks to provide a cheaper and in many respects a more satisfactory binder for refractory and heat insulating cements.

In general, binding materials for cements fall into two distinct classes. One class includes substances which hold the cement together after it has set, or has been dried and fired. The various clays, including the fire clays and bentonite are materials of this type. They form a hard, coherent mass on setting, or firing, and hold the various other constituents of the mass firmly together.

The other class of binders includes the fibrous substances that are used to hold the mix together while in a plastic state by mechanical means. Mineral fibers, such as asbestos, have been used exclusively for this purpose in refractory and heat insulating cements, although animal hair has been extensively used in the making of mortars and plasters.

It is probable that organic fibres have heretofore been considered impractical for use in refractory cements because they burn out when the cement is fired. These fibrous binders, however, have the advantage that they are excellent binders for the wet mix and will serve to hold it in place during application and drying. Furthermore, organic fibrous material, particularly animal hair, is cheaper, lighter and longer fibered than asbestos.

I have now discovered that the combustibility of organic fibers is not a disadvantage but is an advantage if the other ingredients of the material are properly selected. I have now found that with the use of such fibers as animal hair, cements may be prepared which are adapted either for heat insulation at room temperature or for insulation at greatly elevated temperatures.

It is, then, an object of this invention to produce refractory and heat insulating cements in which animal hair or other organic fibrous material is used as a binding agent to replace part or all of the asbestos commonly employed for this purpose.

It is a further object of this invention to provide a heat resistant and heat insulating cement which contains organic fibers, such as animal hair, for a binding material, in combination with plastic clays and mineral substances, such as exfoliated vermiculite.

Other and further objects of this invention will be evident from the following specification and the accompanying claims.

The most important part played by the fibrous member in such composition is to facilitate the application of the cement by holding it together prior to setting. After the cement has set, any fibrous binder which it may contain has fulfilled its most important purpose and the composition will thereafter be bound together mainly by some constituent of the first class described above. This means that the fiber may be removed after the composition has set, without seriously affecting the quality of the resulting product.

Such a removal of the fiber is not possible when the fiber is composed of a mineral substance, but when an inflammable fiber such as animal hair is used, it burns out as soon as the cement is heated for the first time after its application, leaving a multitude of voids or spaces within the material. These resulting dead air spaces are very advantageous for heat insulating purposes, and the resulting coating is much better adapted for heat resisting purposes than if a mineral fiber which would not burn out, had been employed.

The fiber which I have found to be most advantageous for this purpose is animal hair, preferably that from cattle. Plasterer's hair or any commercial hair may be used.

Hair is not only a much cheaper binding material than any mineral fiber, but it is less dense, thereby reducing the weight of the cement, and its binding qualities are superior to those of any mineral fiber.

Vegetable fibers will act in a somewhat similar way though they are, in general, less satisfactory than hair. Among others, hemp, sisal, kapok, wool, and cotton may be mentioned as operative.

As a binding material to hold my cement together after it has set, I prefer to use fire clay. For this purpose I prefer the grade known as "plastic" rather than "flint" clay. It has the advantage of being more refractory than bentonite, a material sometimes used for the same purpose, and is also cheaper. It has very little shrinkage on firing, as compared to bentonite or other materials, and gives greater wall coverage per unit weight or volume of the cement. Other plastic clays may be substituted for plastic fire clay but are not to be preferred where highly refractory properties are desired.

I find my invention particularly well suited for use with compositions containing exfoliated vermiculite, biotite, zonolite and similar exfoliated minerals. These exfoliated minerals are used in small, irregular granules. Various sizes may be used, but I prefer those which will go through a screen having a 3/8 inch mesh but will remain on a 20 mesh screen.

It will be understood that by "exfoliated" I refer to the process of heating such minerals to a high temperature, whereby the water of crystallization is expelled and the mineral is caused to expand greatly, producing an irregular porous mass. These exfoliated minerals give insulating value to the composition, but their shape and size are not calculated to add binding qualities to the mixture. When a large proportion of the exfoliated mineral is added, the insulating, or heat resisting qualities of the mixture are improved, but the cement becomes less manageable in the plastic state, and more difficult to apply. A small amount of hair added to this mixture to act as a binder, however, results in a cement which is very easily applied and which has ample binding qualities before the setting takes place, even though it may contain a very high percentage of exfoliated vermiculite.

Fire resisting cements have been made by the use of mineral, slag or rock wool, as an essential ingredient. When this is done asbestos is preferably added to act as a binding material. I have now found that animal or vegetable fibers such as specified above may replace the asbestos. If this is done the advantages will be those mentioned above, namely, cheaper price, a lighter product, better binding qualities, and when the cement is used for refractory purposes, better insulating properties due to the multitude of voids or dead air spaces formed within the cement by the burning out of the hair.

I may use bentonite or similar colloidal clays in my cement, but I prefer to use plastic fire clay which is cheaper and more refractory than bentonite. Fire clay also gives better bonding qualities and less shrinking upon heating and greater coverage of wall space per weight or volume of the material.

As a specific example of my composition using vermiculite, the following formula is given:

Formula 1

| | Per cent |
|---|---|
| Exfoliated vermiculite | 60 to 75 |
| Plastic fire clay "pulverized" | 25 to 40 |
| Animal hair "cattle" | ½ to 2 |

Of course, it will be understood that exfoliated minerals similar to vermiculite may be substituted therefor, and, if the temperature to which the material is to be exposed is not too high, bentonite and related minerals may be substituted for part or all of the fire clay. When this is done, I prefer to keep the composition within the ranges given in the following formula:

Formula 2

| | Per cent |
|---|---|
| Exfoliated vermiculite | 60 to 75 |
| Fire clay (plastic) | 5 to 15 |
| Bentonite | 5 to 15 |
| Hair | ½ to 2 |

If desired, asbestos fibres, which are also a binding material, may be substituted for part of the clay, as in the following formula:

Formula 3

| | Per cent |
|---|---|
| Exfoliated vermiculite | 60 to 70 |
| Fire clay | 15 to 25 |
| Asbestos fibres | 10 to 15 |
| Hair | ½ to 2 |

A composition in which these materials have been substituted for all of the fire clay may be made up as follows:

Formula 4

| | Per cent |
|---|---|
| Exfoliated vermiculite | 60 to 70 |
| Asbestos fibres | 10 to 20 |
| Bentonite | 10 to 20 |
| Hair | ½ to 2 |

It will be understood, however, that plastic fire clay is to be preferred to these substitutes therefor. Not only does it give greater coverage and less shrinkage on firing than bentonite, but it is cheaper and more refractory.

Mineral, slag or rock wool may also be substituted for part or all of the vermiculite. When this substitution is made, the ranges and proportions of the following formula will be found most satisfactory:

Formula 5

| | Per cent |
|---|---|
| Mineral wool | 60 to 80 |
| Clay | 10 to 20 |
| Hair | ½ to 2 |
| Asbestos | up to 10 |

Vermiculite is an optional ingredient in this formula and may be used to replace any desired proportion of the mineral wool.

It will be seen that the above formulas include a wide range of ingredients and that the properties of the resulting cements may be varied through a wide range by varying either the proportions or the ingredients, thus adapting these cements to a wide variety of uses.

For example, if it is desired to use the cement under conditions where the hair will be burned out, it is desirable to employ a large proportion of fire clay, since this will act as a binder after the material has been fired, while the hair makes an exceptionally good binder to retain the material during application and before setting.

If, however, the material is to be used as a pipe or wall covering, where it will not be exposed to temperature sufficient to burn the hair or other organic fiber, the fiber may be depended upon to replace part of the permanent binder. It is under these conditions that cheaper materials may be advantageously substituted for part of the fire clay.

When my cement is used to produce molded insulators, a mix in which mineral, slag, or rock wool is substituted for part or all of the vermiculite as in Formula No. 5 above is very preferable. The molded insulators may either be fired or not, as desired, depending upon the use to which they are to be put. Other plastic clays than fire clay may be used where highly refractory properties are not required.

The ingredients for my cement should preferably be mixed dry in any suitable mill or mixing device which does not exert a severe pounding, grinding or matting action. A mill having a pounding, grinding or matting action is to be avoided since it will flatten the particles of vermiculite and pulverize the mineral wool. The hair should preferably be shredded or combed out in some suitable carding device before mixing with the other ingredients.

I am aware that numerous details of the process may be varied through a wide range without departing from the principles of this invention, and I, therefore, do not purpose limiting the patent granted hereon otherwise than necessitated by the prior art.

I claim as my invention:

1. A heat resisting cement containing from 60 to 70% of exfoliated vermiculite, 20 to 30% of fire clay, and ½ to 2% of hair, said hair burning out under high temperatures to form numerous voids.

2. A heat resisting cement containing from 60 to 70% of exfoliated vermiculite, 15 to 25% of fire clay, 10 to 15% of asbestos fibres and ½ to 2% of hair, said hair burning out after the cement has set to form numerous voids.

3. A refractory insulating cement having good spreading and binding qualities when applied as a wet mix and forming after being set and burned a porous refractory insulation, said cement comprising a binder of plastic fire clay in excess of 5% by weight of the mixture, exfoliated vermiculite in an amount equal to at least 60% by weight of the mixture and a minor percentage of hair.

OTIS L. JONES.